Nov. 24, 1931.　　　H. E. STRUNK　　　1,833,502
MEANS FOR CORING FREEZING LIQUIDS
Filed Dec. 18, 1929
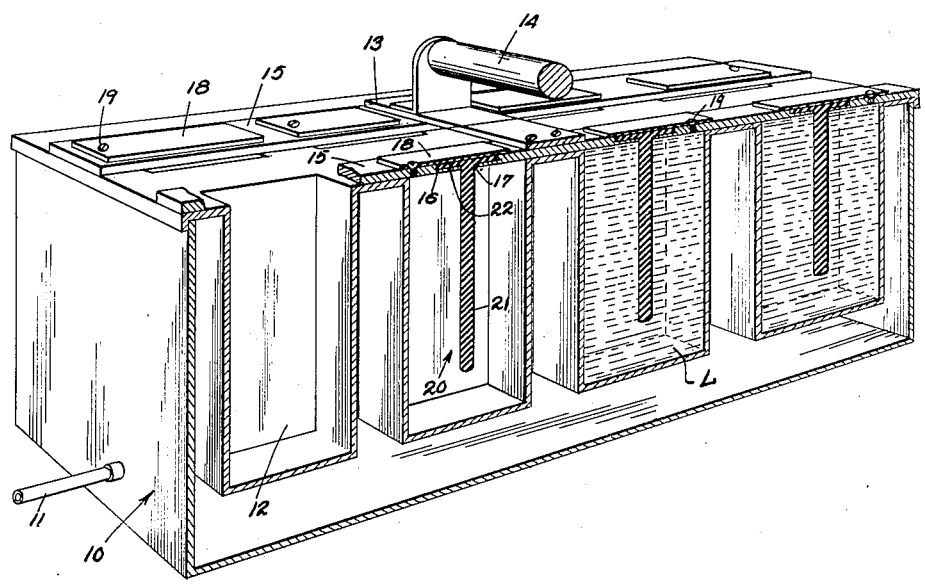
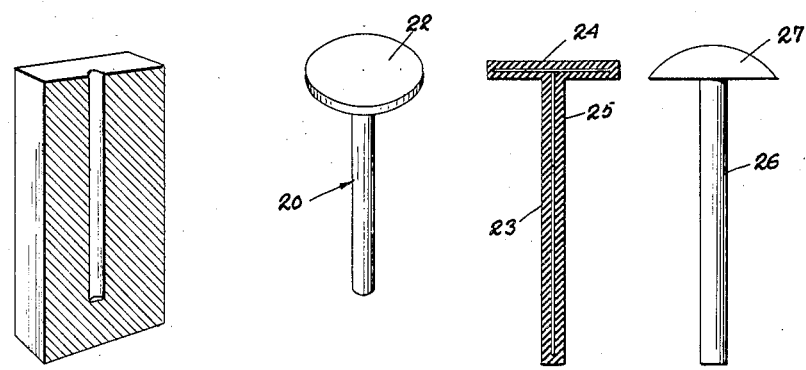
Inventor
Harry E. Strunk.
by Hazard and Miller
Attorneys Patented Nov. 24, 1931

1,833,502

UNITED STATES PATENT OFFICE

HARRY E. STRUNK, OF ONTARIO, CALIFORNIA, ASSIGNOR, BY MESNE ASSIGNMENTS, TO POPSICLE SERVICE, INC., OF CHICAGO, ILLINOIS, A CORPORATION OF ILLINOIS

MEANS FOR CORING FREEZING LIQUIDS

Application filed December 18, 1929. Serial No. 415,057.

This invention relates to a means and method of coring liquids which are to be frozen into solids. It has been customary to place upon the market an article of confection in the form of a frozen sucker, comprising usually a wooden handle or stick on which is mounted a frozen body of liquid. This liquid may be in the form of ice cream, sherbet, or the like. A problem has been presented of freezing the milk in making the ice cream, or in freezing the sherbet, as the case may be, and coring holes in the liquid during the freezing, which are to receive the ends of the stick handles. Heretofore it has been common practice to freeze the liquid in a container and suspend the stick handles in the liquid, freezing the liquid around the sticks. In carrying out such a process certain disadvantages are present in that it is sometimes somewhat difficult to properly suspend the sticks in such a manner as to keep the freezing most efficient.

Consequently it is an object of this invention to provide a new means and method of coring holes in the liquid, as it freezes, which will enable the freezing to be carried out most efficiently. A difficulty has been presented, however, in using a core which can be readily removed from the liquid after the liquid has been frozen. Most cores when frozen in the liquid are solidly held therein and cannot be removed without danger of breaking the frozen body of liquid. This is due to the liquid contracting about the core as it freezes and also to the adhesive bond formed between the liquid and the core. I have discovered, however, that a suitable core may be used for this purpose in which the adhesive bond between the liquid and the core is reduced to a minimum and which can be readily removed from the frozen body of liquid without danger of breaking the body.

It is another object of the invention to provide a means and method of coring holes in liquids to be frozen which contemplates utilizing a rubber core as the adhesive bond between the liquid and the surface of the rubber is reduced to a minimum. Furthermore I find that the core can be easily and quickly removed from the body of liquid after it has been frozen without danger of breaking.

With the foregoing and other objects in view, which will be made manifest in the following detailed description, and specifically pointed out in the appended claims, reference is had to the accompanying drawings for an illustrative embodiment of the invention, wherein:

Fig. 1 is a sectional view in perspective, illustrating a freezing apparatus utilizing the improved means and method.

Fig. 2 is a sectional view in perspective, illustrating one of the frozen bodies after the core has been removed.

Fig. 3 is a perspective view of a rubber core which may be utilized.

Figs. 4 and 5 illustrate modifications thereof.

Referring to the accompanying drawings, wherein similar reference characters designate similar parts throughout, the freezing apparatus illustrated comprises a brine tank 10, which may be supplied as by pipe 11 with cold brine. Suspended in the brine tank are a plurality of cells 12, each of which is adapted to contain the liquid L which may be milk, or flavored water, depending on whether ice cream is to be produced or sherbet. These cells are spaced from each other, enabling the brine to circulate freely between them to cool and freeze the liquid L therein. As the details of the freezing apparatus are immaterial insofar as this invention is concerned it will be readily understood that the application of the improved means and method is not restricted to the particular refrigerating construction shown.

Positioned over the top of the cells there is a longitudinal bar 13, having a suitable handle 14 by which it can be raised and lowered. Transverse bars 15 are secured to the under side of the longitudinal bar 13, each transverse bar being positioned over a row of cells 12. Sockets or recesses 16 are formed in the transverse bars 15, which are positioned over the center of their respective cells 12, and in the center of each socket or recess there is formed an aperture 17. The sockets or recesses are preferably covered normally by cover plates 18 which can be swung laterally on the rivets 19 to uncover the sockets. The cores are generally designated at 20, the preferred form being illustrated in Fig. 3. The preferred form of core comprises a cylindrical stem 21, having at its top a flat head 22 which fits in the socket 16 with the stem 21 extending through aperture 17 so as to be suspended in the liquid in its respective cell. The stem and head are formed of live soft elastic rubber. In the modification shown in Figure 4 the stem 23 is likewise formed of soft elastic rubber, having a head 24. This form of core is shown as being reinforced or stiffened as by a wire 25 positioned centrally thereof. The modification shown in Figure 5 is substantially the same as that illustrated in Figure 3, having a stem 26 and a head 27. However, the head is shown as having a rounded top rather than a flat top.

When the liquid L to be frozen has been poured into the cells 12, the frame thus provided, with the cores 20 mounted thereon, is lowered onto the freezing apparatus, suspending the cores in the liquid. The liquid then freezes about the cores. After the liquid has frozen, the cores can be easily pulled out of the frozen liquid by the frame and it will be found that the adhesive bond between the frozen liquid and the core is very small and cannot be compared with the adhesive bond formed when a metal or wood core is used.

Whatever adhesive bond there is present between the liquid and the rubber core is readily broken by virtue of the fact that as the core is pulled it is stretched. At the same time the diameter of the core is decreased so that in effect this decrease in diameter causes the core to pull or peel away from the walls of the hole in the frozen block formed thereby. I find that by using a rubber core not only is it possible to easily and quickly remove the core, leaving a clean hole, but that danger of breaking the block of frozen liquid is practically negligible. After the cores have been removed, sticks which form the handles can be dropped into the holes thus formed. Usually these sticks can be dropped into their holes while the sticks are dry but I find it advantageous to moisten them slightly before inserting them into the holes.

Due to the low temperature, the rubber used in the cores deteriorates in the course of time and from time to time it may be found necessary to replace certain cores. This can be easily accomplished by swinging the cover plates 18 laterally, lifting the cores out of their sockets, and substituting new cores.

The sticks which form the handles may be positioned in the holes formed by the cores either before or after the bodies of frozen liquid have been removed from their cells. The bodies can be easily removed by lowering the cells in warm water for a short period of time and then inverting the cells.

From the above described construction it will be appreciated that a novel, simple and advantageous method and means of forming holes in freezing liquids is provided, which enables a clean hole to be formed and the core removed without danger of breaking the body of frozen liquid. While there may be other materials which may accomplish substantially the same results as rubber, I prefer the use of rubber as I find that the adhesive bond between a frozen liquid and rubber is very small and can be easily broken.

Various changes may be made in the details of construction without departing from the spirit or scope of the invention as defined by the appended claims.

I claim:

1. Means for coring a hole in a liquid which is fluid at normal temperatures and which is to be frozen comprising an elastic rubber core, and means for suspending the core in the liquid.

2. Means for coring a hole in a liquid which is fluid at normal temperatures and which is to be frozen comprising suspending means, and an elastic core having a head at its upper end suspended by the suspending means.

3. Means for coring a hole in a liquid which is fluid at normal temperatures and which is to be frozen comprising a suspending frame having apertures therein, and elastic rubber cores having heads at their upper ends suspended by the heads through the apertures.

In testimony whereof I have signed my name to this specification.

HARRY E. STRUNK.